United States Patent [19]

McWilliams et al.

[11] Patent Number: 4,925,584

[45] Date of Patent: May 15, 1990

[54] METHOD OF MANUFACTURING A MICROPOROUS THERMALLY INSULATING ROOF

[75] Inventors: Joseph A. McWilliams, Droitwich; Derek E. Morgan, Malvern; James D. J. Jackson, Kidderminster, all of United Kingdom

[73] Assignee: Micropore International Limited, Worcestershire, United Kingdom

[21] Appl. No.: 387,386

[22] Filed: Jul. 31, 1989

Related U.S. Application Data

[63] Continuation of Ser. No. 144,651, Jan. 11, 1988, abandoned, which is a continuation of Ser. No. 925,094, filed as PCT GB86/00137 on Mar. 12, 1986, published as WO86/05479 on Sep. 25, 1986, abandoned.

[30] Foreign Application Priority Data

Mar. 13, 1985 [GB] United Kingdom ............... 8506505

[51] Int. Cl.$^5$ .............................................. E04B 1/74
[52] U.S. Cl. ..................................... 252/62; 106/122; 252/378 R; 264/122
[58] Field of Search ............. 106/122; 252/62, 378 R; 264/122

[56] References Cited

U.S. PATENT DOCUMENTS

| | | | |
|---|---|---|---|
| 3,753,923 | 8/1973 | Wada | 252/62 |
| 4,269,628 | 5/1981 | Ballard et al. | 106/86 |
| 4,394,337 | 7/1983 | Kummermehr | 264/122 |
| 4,529,532 | 7/1985 | Gliem et al. | 252/62 |
| 4,539,046 | 9/1985 | McAloon et al. | 106/121 |

FOREIGN PATENT DOCUMENTS

| | | |
|---|---|---|
| 1089096 | 11/1967 | United Kingdom . |
| 1135464 | 12/1968 | United Kingdom . |
| 1200745 | 7/1970 | United Kingdom . |

*Primary Examiner*—Robert A. Wax
*Attorney, Agent, or Firm*—Browdy and Neimark

[57] ABSTRACT

A method of manufacturing a microporous thermally insulating body comprises mixing together a finely divided microporous insulating material such as silica aerogel or pyrogenic silica and a solid ammonia-generating compound in particulate form, and compressing the mixture to form a thermally insulating body. The ammonia-generating compound is dispersed evenly throughout the insulating material and may comprise, for example, ammonium carbonate, ammonium acetate or urea. Preferably, the ammonia-generating compound comprises a mixture of about one third by weight of ammonium carbonate and about two thirds by weight of ammonium bicarbonate together with a small proportion of magnesium oxide.

19 Claims, No Drawings

METHOD OF MANUFACTURING A MICROPOROUS THERMALLY INSULATING ROOF

This application is a continuation of application Ser. No. 07/144,651 filed Jan. 11, 1988, now abandoned, which is a continuation of application Ser. No. 925,094, filed as PCT GB86/00137 on Mar. 12, 1986, published as WO86/05479 on Sep. 25, 1986, now abandoned.

The present invention relates to a method of manufacturing a microporous thermally insulating body from a finely divided insulating material together with reinforcing fiber and/or opacifier if required.

The finely divided insulating material may be silica aerogel. Alternatively, the finely divided insulating material may be pyrogenic silica (sometimes called fume silica) or any other suitable finely divided material.

Thermally insulating bodies made from finely divided insulating material are notable for their relative lack of strength, which means it has heretofore generally been necessary to enclose such bodies in a protective envelope, for example of glass or quartz fiber, or, as proposed in European Patent Publication No. 0,027,264, to use a low melting point binder which cements together the particles of the finely divided insulating material. However, the incorporation of a mechanical bond between the particles increases the thermal conductivity of the bodies to a level which can be unacceptable.

It has been proposed, for example in U.S. Pat. No. 4,529,532, to add to the insulating material nitrogen containing substances which show a basic reaction in aqueous solution. Examples of suitable substances are gaseous ammonia and aqueous solutions of ammonia, ammonium carbonate, urea or water-soluble amines. However, we have found that gaseous ammonia does not in practice demonstrate any significant improvement in strength and, when manufacturing the insulation material on a commercial scale, the handling of gaseous ammonia presents difficulties. Moreover, aqueous solutions are difficult to disperse evenly throughout the insulation material and can cause the finely divided insulating material to degrade.

It is therefore an object of the present invention to provide a method of manufacturing a microporous thermally insulating body having increased strength without increasing the thermal conductivity to an unacceptable level and without otherwise degrading the insulating material.

According to the present invention there is provided a method of manufacturing a microporous thermally insulating body, which method comprises the steps of;

mixing together a finely divided microporous insulating material and a solid ammonia-generating compound in particulate form such that the ammonia-generating compound is dispersed evenly throughout the insulating material; and compressing the mixture to form a thermally insulating body.

The finely divided insulating material may be, for example, silica aerogel or pyrogenic silica.

The expression "ammonia-generating compound" is intended to mean herein a compound which evolves ammonia when it decomposes. Examples of solid ammonia-generating compounds are ammonium carbonate, ammonium acetate and urea. Some care may be required to ascertain that the particular ammonia-generating compound when it decomposes does not additionally generate other compounds which have a deleterious effect on the thermally insulating body, but this can be determined in each case by straightforward experiments which require no inventive skills. Some ammonia-generating compounds decompose of their own accord, but others may require steps to be taken in order to cause the ammonia-generating compound to decompose. For example, it may be necessary to subject the compressed thermally insulating body to a heating step. Moreover, it may be necessary to employ steam during the heating step.

Ammonium carbonate when used in commercial quantities tends to cake, but we have found that a mixture of substantially one third by weight ammonium carbonate and substantially two thirds by weight of ammonium bicarbonate, preferably with a relatively small proportion (approximately 1 per cent by weight) of magnesium oxide, remains free flowing. Ammonium bicarbonate is not used by itself because it has a lower vapour pressure at ambient temperature than ammonium carbonate and thus is not so effective.

The mixture may also contain an infra-red opacifier such as titanium dioxide (rutile or anatase), ilmenite, zirconium dioxide, chromium dioxide, iron oxide, manganese dioxide, a carbide such as silicon carbide, black ferrosoferric oxide or carbon black. Further, the mixture may contain a reinforcing fiber which may be, for example, aluminosilicate fiber or alumina fiber.

The composition of the mixture may vary considerably depending on the particular application of the thermally insulating body, but generally the proportion of the ammonia-generating compound will be at least 0.05 per cent by weight of the mixture and may be as high as 10 per cent by weight or more. Surprisingly, we have found that the insulating material is tolerant of a wide range of the proportion of the ammonia-generating compound: that is, small quantities of the compound demonstrate a significant effect on the strength of the body, whereas large quantities do not appear to have any detrimental effects.

The mixture may be compressed to a wide range of densities, but we have found densities in the range from 160 kg m$^{-3}$ to 640 kg m$^{-3}$ to be suitable.

The decomposition of the ammonia-generating compound may occur naturally under ambient conditions when using metastable compounds such as ammonium carbonate or ammonium acetate, but more stable compounds such as urea can be decomposed in an autoclave. We have found that, if left to age, bodies of the insulating material containing ammonium carbonate will progressively increase in strength up to a period of at least twenty-one days. Strengthening can be accelerated by using an autoclave and we have found that the strength of the thermally insulating body increases progressively as the pressure rises at least up to 138 kPa.

Solid ammonia-generating compounds are employed because solids are readily distributed throughout the mixture and allow a controlled evolution of ammonia. Gaseous ammonia does not demonstrate any significant improvement in strength, whereas aqueous ammonia is difficult to disperse evenly.

The thermally insulating body may be subject to a further treatment by which it is raised to an elevated temperature for a certain time. We have found that heat treatment at 125° C. for a period of 24 hours results in a further significant increase in strength, although there is no reason why other temperatures and/or durations should not produce satisfactory results.

The ammonia-generating compound decomposes substantially entirely and we believe that a chemical reaction takes place which results in a stronger bond between the individual particles of the finely divided material. The thermal conductivity of the body rises as the strength increases, but this is to be expected and is a result of higher thermal conduction across the stronger bonds. However, the other components of the overall thermal conductivity (radiation, convection) are unchanged.

Known thermally insulating bodies made from finely divided insulating material suffer during manufacture from a characteristic known as "springback". That is to say, after the compression force has been removed from the insulating material a degree of expansion occurs. Expansion occurs rapidly at first, but generally stabilises within 24 hours. High springback results in difficulties with the production of bodies to high tolerance and cracks can also arise. However, we have found that ammonia-generating compounds which decompose of their own accord significantly reduce the springback effect.

The invention is illustrated by the following examples:

EXAMPLE 1 (COMPARATIVE)

An insulating material was prepared by mixing together for 30 seconds in a blade mixer rotating at about 6000 rpm a mixture of 1890 grams of pyrogenic silica manufactured by Degussa AG and sold under the Trade Mark "Aerosil 300", 960 grams of finely divided rutile having an average particle size below about 10 µm and 150 grams of an aluminosilicate fiber manufactured by The Carborundum Company Limited and sold under the Trade Mark "Fiberfrax". The insulating material was then compressed into discs having a diameter of 110 mm and a thickness of 25 mm. The weight of material in each disc was 80 grams resulting in a density of 336 kg m$^{-3}$.

The discs were then subjected to various treatments after which the tensile strength of the discs was measured. The results are summarised in Table 1.

TABLE 1

| nature of treatment | tensile strength kNm$^{-2}$ |
| --- | --- |
| none | 53.8 |
| aged 3 days | 53.9 |
| aged 7 days | 53.8 |
| aged 14 days | 53.7 |
| aged 21 days | 53.8 |
| steam autoclaved for 1 hr at 103 kPa | 95.8 |
| steam autoclaved for 3 hrs at 103 kPa | 115.1 |
| heat treated at 125° C. for 24 hrs | 68.3 |
| steam autoclaved for 4 hrs at 103 kPa followed by heat treatment at 125° C. for 24 hrs | 110.0 |

The tensile strength of the bodies of insulation material was determined by a procedure described in Materials Research and Standards, April 1963, pages 283 to 289.

EXAMPLE 2

An insulating material was prepared in the same manner as the insulating material of Example 1, except that 1 per cent by weight of ammonium carbonate was added to the mixture prior to the mixing of the components. Discs were pressed from the mixture as before and the tensile strength of the discs was measured after a number of different periods. The results are summarised in Table 2 below:

TABLE 2

| days since manufacture | tensile strength kNm$^{-2}$ |
| --- | --- |
| 1 | 85.2 |
| 3 | 91.7 |
| 7 | 95.5 |
| 14 | 99.3 |
| 21 | 102.1 |

EXAMPLE 3

Discs were produced by the method of Example 2, except that the percentage by weight of ammonium carbonate added to the mixture was varied. The tensile strength of the discs was measured seven days after they had been pressed and the results are summarised in Table 3.

TABLE 3

| percent by weight ammonium carbonate | tensile strength kNm$^{-2}$ |
| --- | --- |
| 0.125 | 74.8 |
| 0.25 | 81.7 |
| 0.5 | 87.1 |
| 1.0 | 95.5 |
| 5.0 | 97.8 |
| 10.0 | 98.3 |

EXAMPLE 4

Discs were produced by the method of Example 2, except that in place of ammonium carbonate a mixture of substantially one third by weight ammonium carbonate and substantially two thirds by weight of ammonium bicarbonate with a small proportion of magnesium chloride was added to the insulation mixture. Ammonium carbonate when used in commercial quantities tends to cake and the resulting lumps must be broken up before the material can be used, whereas the ammonium carbonate/bicarbonate mixture remains free flowing. With 5 per cent by weight of the carbonate/bicarbonate mixture the strength of the discs was found to be 89.6 kNm$^{-2}$ and with 10 per cent by weight of the carbonate/bicarbonate mixture the strength of the discs was found to be 95.9 kNm$^{-2}$.

EXAMPLE 5

Discs were produced by the method of Example 2, except that one per cent by weight of urea

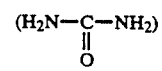

was added to the mixture in place of ammonium carbonate. Discs were pressed from the mixture as before and were steam autoclaved with saturated steam at a number of different pressures for varying times. The tensile strength of the discs was then determined and the results are summarised in Table 4 below:

TABLE 4

| steam pressure kPa | time in autoclave hr | tensile strength kNm$^{-2}$ |
|---|---|---|
| 35 | 1 | 115.8 |
| 35 | 3 | 135.8 |
| 35 | 6 | 126.8 |
| 69 | 1 | 130.3 |
| 69 | 3 | 145.5 |
| 69 | 6 | 132.4 |
| 103 | 1 | 142.7 |
| 103 | 3 | 157.2 |
| 103 | 6 | 148.9 |
| 138 | 1 | 143.4 |

Thus, it will be seen that the tensile strength increases with increasing pressure in the autoclave for any given time in the autoclave.

EXAMPLE 6

A number of discs were made by the method of Example 5, but subsequent to the autoclave treatment were subjected to heat treatment at 125° C. for 24 hours. The results are summarised in Table 5.

TABLE 5

| autoclave treatment with steam at 103 kPa | tensile strength kNm$^{-2}$ |
|---|---|
| none | 68.3 |
| 3 hrs | 164.2 |
| 4 hrs | 170.0 |

EXAMPLE 7 (COMPARATIVE)

This example was carried out to demonstrate the effect of generating ammonia with the autoclave and of exposing a disc made in accordance with Example 1 to the ammonia gas. The disc was autoclaved for 1 hr with saturated steam at 103 kPa and 15 grams of urea in the autoclave. The disc was subsequently found to have a tensile strength of 93.8 kNm$^{-2}$.

EXAMPLE 8

A number of discs were made by the method of Example 3, the discs being compressed to a measured thickness of 21.5 mm. The discs were maintained in a compressed state for a period of 2 minutes and the pressure was then released. Springback was calculated as the percentage increase in the thickness of the discs when the discs had reached equilibrium thickness. The results are shown in Table 6 below:

TABLE 6

| Ammonium carbonate (% by weight) | Springback (percent) |
|---|---|
| 0 | 22.2 |
| 1 | 12.2 |
| 2 | 11.5 |
| 5 | 8.2 |
| 10 | 5.3 |
| 20 | 3.3 |

We believe that the examples show that the incorporation of an ammonia-generating compound into a body of finely divided insulating material and the subsequent release of the ammonia results in the production of an insulating material having superior strength over similar known insulating materials. Ammonia-generating compounds which decompose of their own accord additionally produce insulating materials with reduced springback. A subsequent heat treatment further enhances the strength of the insulation material.

We claim:

1. A method of manufacturing a compressed microporous thermally insulating body, which method comprises the steps of:
   forming a solid particulate dry mixture consisting essentially of a finely divided substantially dry microporous insulating material with a substantially dry ammonia-generating compound in particulate form such that the ammonia-generating compound is dispersed evenly throughout the solid particulate mixture; and
   compressing said solid, particulate substantially dry mixture to form a thermally insulating body.

2. A method according to claim 1, wherein the proportion of the ammonia-generating compound is from 0.05 to 10 per cent by weight of the mixture.

3. A method according to claim 1 and including the further step of heat treating the thermally insulating body at 125° C. for 24 hours.

4. A method according to claim 1, wherein the solid ammonia-generating compound in particulate form comprises ammonium carbonate or ammonium acetate.

5. A method according to claim 1, wherein the solid ammonia-generating compound in particulate form comprises a mixture of substantially one third by weight of ammonium carbonate and substantially two thirds by weight of ammonium bicarbonate.

6. A method according to claim 5, wherein the mixture of ammonium carbonate and ammonium bicarbonate includes a relatively small proportion of magnesium oxide.

7. A method according to claim 1, wherein the solid ammonia-generating compound in particulate form comprises urea.

8. A method according to claim 7 and including the further step of heating the thermally insulating body in saturated steam in an autoclave so as to decompose the urea.

9. A method according to claim 2 and including the further step of heat treating the thermally insulating body at 125° C. for 24 hours.

10. A method according to claim 2, wherein the solid ammonia-generating compound in particulate form comprises ammonium carbonate or ammonium acetate.

11. A method according to claim 3, wherein the solid ammonia-generating compound in particulate form comprises ammonium carbonate or ammonium acetate.

12. A method according to claim 9, wherein the solid ammonia-generating compound in particulate form comprises ammonium carbonate or ammonium acetate.

13. A method according to claim 2, wherein the solid ammonia-generating compound in particulate form comprises a mixture of substantially one third by weight of ammonium carbonate and substantially two thirds by weight of ammonium bicarbonate.

14. A method according to claim 3, wherein the solid ammonia-generating compound in particulate form comprises a mixture of substantially one third by weight of ammonium carbonate and substantially two thirds by weight of ammonium bicarbonate.

15. A method according to claim 9, wherein the solid ammonia-generating compound in particulate form comprises a mixture of substantially one third by weight of ammonium carbonate and substantially two thirds by weight of ammonium bicarbonate.

16. A method according to claim 2, wherein the solid ammonia-generating compound in particulate form comprises urea.

17. A method according to claim 3, wherein the solid ammonia-generating compound in particulate form comprises urea.

18. A method according to claim 9, wherein the solid ammonia-generating compound in particulate form comprises urea.

19. The method of claim 8, wherein after said autoclaving, said thermally insulating body is then heat treated for about 24 hours at about 125° C.

* * * * *